Sept. 13, 1932.   C. G. LILJEBERG   1,877,515
GRINDING MACHINE
Filed Feb. 29, 1932    3 Sheets-Sheet 1

Inventor
CARL G. LILJEBERG

By  HH Parsons
Attorney

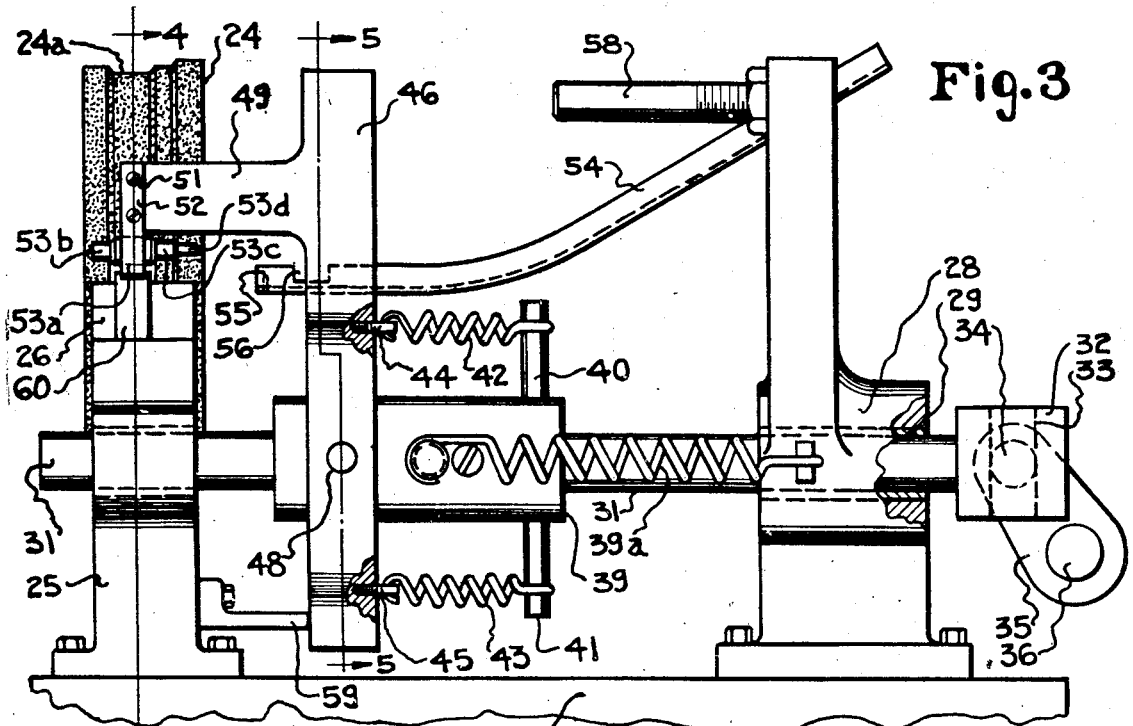
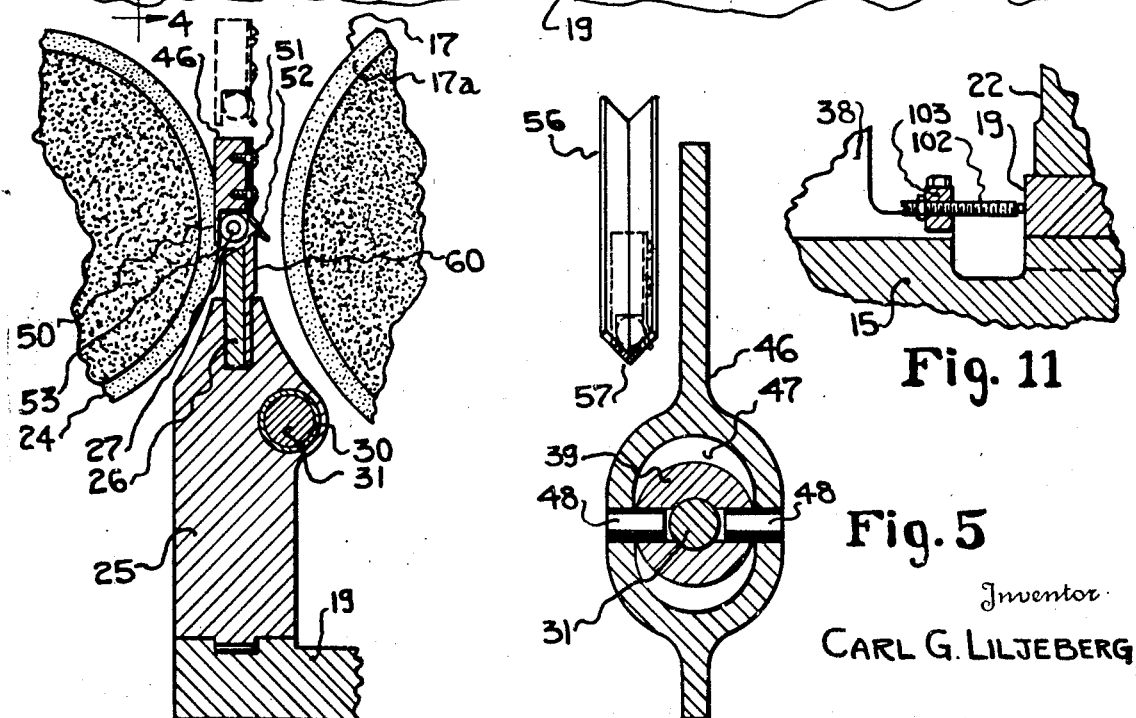

Sept. 13, 1932.   C. G. LILJEBERG   1,877,515
GRINDING MACHINE
Filed Feb. 29, 1932   3 Sheets-Sheet 3
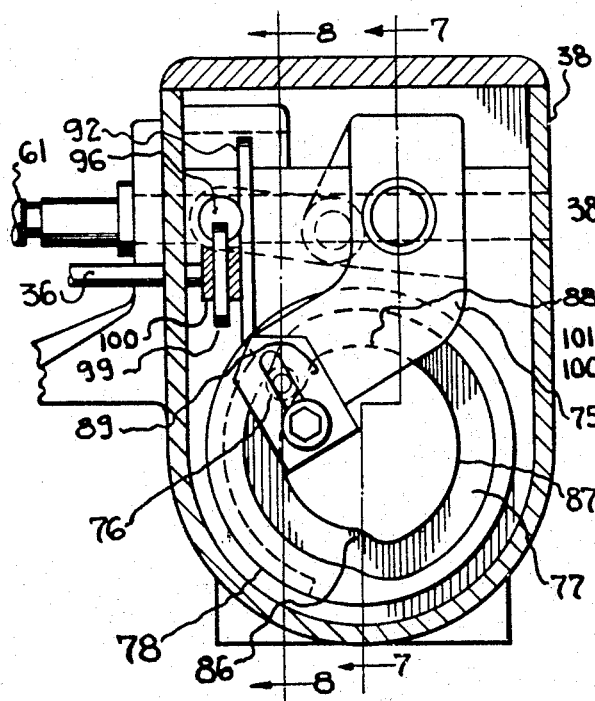
Fig. 6
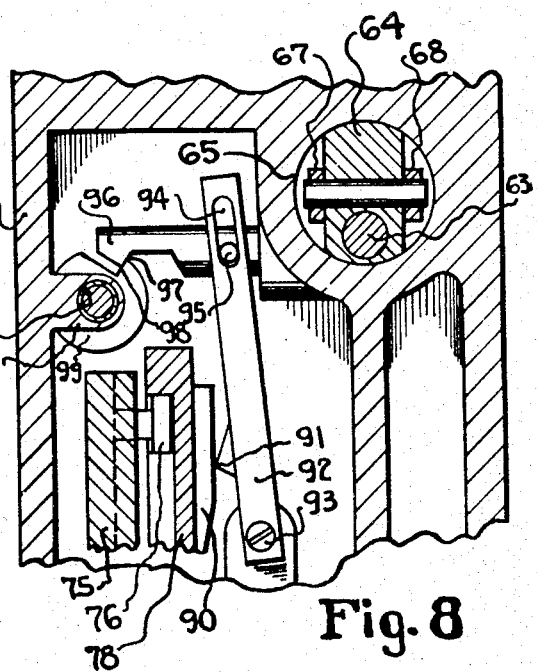
Fig. 8
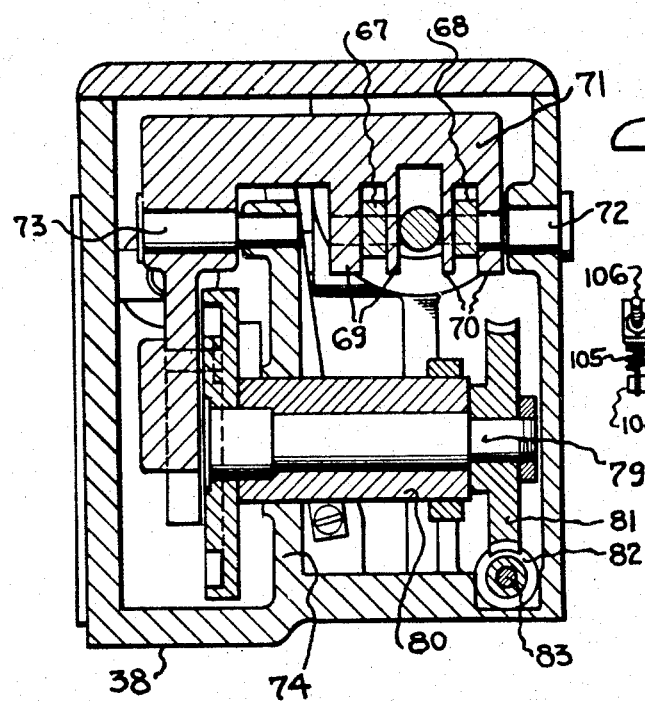
Fig. 7
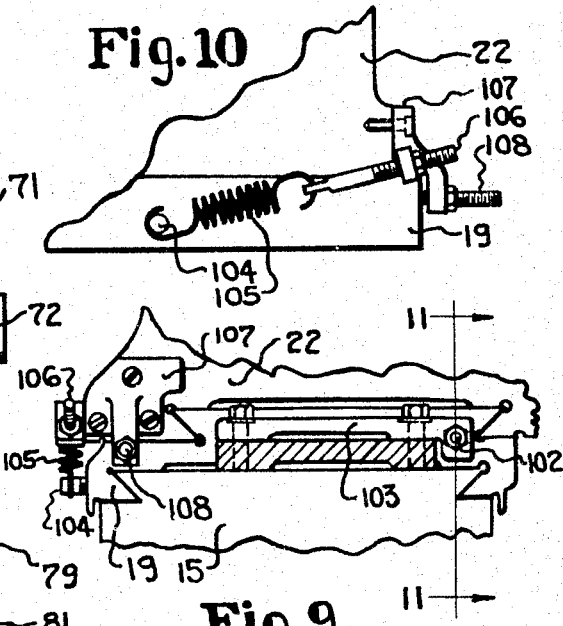
Fig. 10
Fig. 9
Inventor
CARL G. LILJEBERG
By H. K. Parsons
Attorney Patented Sept. 13, 1932

1,877,515

UNITED STATES PATENT OFFICE

CARL G. LILJEBERG, OF PITTSBURGH, PENNSYLVANIA, ASSIGNOR TO CINCINNATI GRINDERS INCORPORATED, OF CINCINNATI, OHIO, A CORPORATION OF OHIO

GRINDING MACHINE

Application filed February 29, 1932. Serial No. 595,706.

This invention relates to improvements in machine tools and especially to improvements in centerless grinding.

An object of the invention is the provision of an improved centerless grinder for expeditiously grinding small irregular shaped circular work pieces.

Another object of the invention is the provision of improved means for expeditiously placing work pieces on the work rest blade of a centerless grinder.

A further object of the invention is the provision of an automatic centerless grinder for accomplishing the above objects.

Other objects and advantages of the present invention should be readily apparent by reference to the following specification considered in conjunction with the accompanying drawings forming a part thereof and it is to be understood that any modifications may be made in the exact structural details there shown and described within the scope of the appended claims without departing from or exceeding the spirit of the invention.

In the drawings:

Figure 3 is a sectional view through the grinding throat showing the parts therein in elevation as particularly seen from line 3—3 on Figure 1.

Figure 4 is a fragmentary sectional view taken on line 4—4 of Figure 3.

Figure 5 is a sectional view taken on line 5—5 of Figure 3.

Figure 6 is a fragmentary sectional view taken on line 6—6 of Figure 2.

Figure 7 is a sectional view taken on line 7—7 of Figure 6.

Figure 8 is a fragmentary sectional view taken on line 8—8 of Figure 6.

Figure 9 is a fragmentary elevational view of the right hand end of the machine in Figure 1 as seen particularly from line 9—9 thereon.

Figure 10 is an enlarged elevational view of certain of the parts shown in Figure 1 and illustrating the yieldable tie between the upper and lower slides.

Figure 11 is a fragmentary sectional view taken on line 11—11 of Figure 9.

Throughout the several views of the drawings similar reference characters are employed to denote the same or similar parts.

Figure 1:
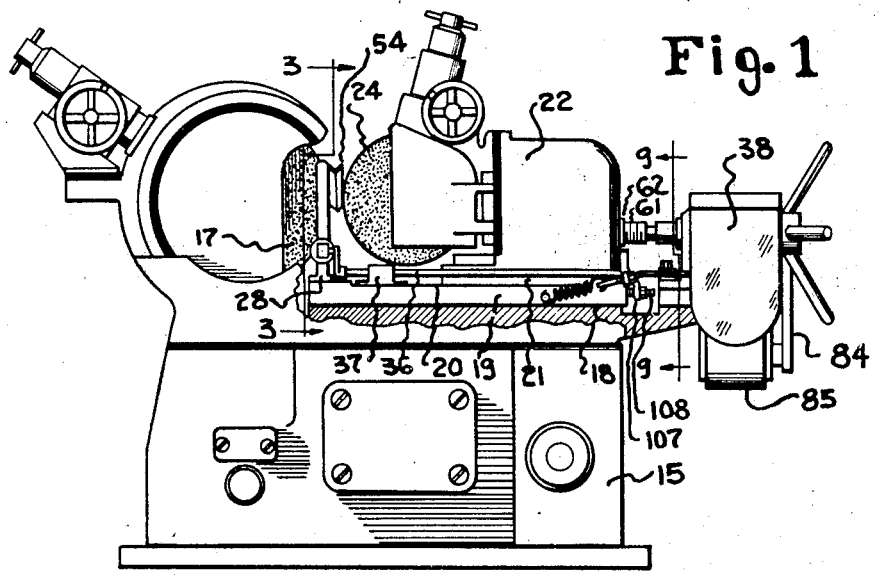
Figure 1 is a front elevation of a centerless grinder embodying the improvements of this invention.

A machine embodying this invention may comprise a bed 15 having rising therefrom at one end thereof the pedestal bearing 16 for a spindle to which is secured a grinding wheel 17 rotatable in a clockwise direction at a high grinding rate of speed. The bed 15 is also provided on its upper surface with guideways 18 for a lower slide 19 adapted to be shifted relative to the bed toward and from the grinding wheel. The slide 19 is provided on its upper surface with a guideway 20 for the upper slide 21 which has secured thereto or formed integral therewith the bracket 22. Carried by the housing and extending transversely of the bed is a housing or head 23 containing a spindle to which is secured the regulating wheel 24. The regulating wheel and its spindle are adapted to be rotated in a clockwise direction at a comparatively slow work rotation controlling rate of speed. The proximate points of the grinding and regulating wheels travel in opposite directions and are spaced from one another a distance to form a grinding throat in which the work is disposed during the actual grinding operation.

The work pieces 53 have an enlarged center portion 53a from one side of which projects bearing portion 53b while from the other side of which projects bearing portions 53c and 53d. It is desired to grind the reduced or bearing portions 53b, 53c, and 53d concentric to one another but not to operate on the enlarged center portion 53a. For this reason the grinding wheel 17 is provided with a relieved portion 17a which in practice aligns with the center portion 53a of the work. Likewise the regulating wheel 24 is provided in its operative face with a relief or undercut 24a aligning in actual practice with the enlarged portion 53a of the work. The undercut 24a in the regulating wheel 24 is greater than that necessary just to clear the work during grinding to assist in discharging the work from the machine as will later appear.

The lower slide 19 has secured to it at its inner end and directly below the grinding throat a work rest block 25 bearing at its upper end a work rest blade 26 having an operative inclined surface 27 inclining in the general direction of the operative face of the regulating wheel and forming therewith a work receiving trough. Similar to the operative faces of the grinding and regulating wheels, the operative surface 27 of the blade 26 is relieved at the point of the enlarged portion 53a of the work so that only the reduced bearing portions of the work contact with the operative surface 27 of the blade during grinding. Also carried by the inner end of the slide 19 is a bracket 28 having formed therein a bushed bore 29 in axial alignment with a bushed bore 30 formed in the work rest block 25. Passing through the aligned bores 29 and 30 is an axially shiftable shaft or bar 31. This bar has secured to its outer end a head 32 in which is formed a slot or groove 33 receiving a pin 34 projecting from a short arm or lever 35 pinned or otherwise secured to one end of a rock shaft 36. The shaft 36 extends along the forward face of the machine, being journaled at one end in a bearing 37 and terminating at its other end in a housing 38.

The rocking of the shaft 36 through means to be later described effects the longitudinal shifting of the bar 31 which has secured to it for movement therewith intermediate its ends a sleeve 39, the bar 31 and parts carried thereby being shifted in the other direction by a spring 39a. The sleeve 39 has projecting therefrom on opposite sides pins 40 and 41 respectively forming an anchor for one end of springs 42 and 43. The springs 42 and 43 have their other ends respectively secured at 44 and 45 to a vertically disposed arm 46. The arm 46 is provided intermediate its ends with an elongated opening 47, see Figure 5, through which the sleeve 39 passes. Pins 48 extend from the sleeve 39 into the side of the opening 47 for pivotally mounting the arm to the sleeve, and the said arm is maintained in a normal vertical position by means of the springs 42 and 43. The arm 46 has projecting from it near its upper end a curved beam 49 having a portion of its forward end considerably reduced to provide a stationary finger 50, see Figure 4. Secured to the beam in alignment with the stationary finger 50 as by means of screws 51 is a spring finger 52 forming a space between itself and the finger 50 of a smaller dimension than the diameter of the body portion 53a of work piece 53, as particularly shown in dotted lines in Figure 4.

Adjacent the mechanism just described is a work loading chute 54 of a V-shaped cross section and, as shown in Figure 5, having at its inner end a stop pin 55 to prevent the discharge of the work pieces from the chute under influence of gravity. Adjacent the stop pin 55, the chute 54 has the sides thereof cut away as at 56 and provides merely a base support for the work as shown at 57 in Figure 5, which support is of a width less than the diameter of the body portion 53a of the work piece resting thereon. The bracket 28 is provided at its upper end with a projecting adjustable stop 58 adapted to engage with the upper end of the arm 46 for effecting its oscillation in a counterclockwise direction about the pivot pins 48. The work rest block 25 is also provided with a stop 59 for engaging the lower end of the arm on its lateral face opposite to that engaged by the stop 58 for also oscillating the arm 46 in a counterclockwise direction.

As shown in Figures 3, 4 and 5, the parts are in the position with the bar 31 travelling to the left, as seen in Figure 3, and with the lower end of the arm 46 just contacting with the stop 59. At this time the beam is in the position shown in dotted lines in Figure 4 and continued movement of the bar 31 to the left causes oscillation of the arm 46 causing the beam to dip toward the work rest blade 26. The work rest blade is provided on its face toward the grinding wheel with a projecting point 60 adapted to engage with the spring finger 52 for lifting it free of the work piece whereupon the work piece drops by gravity onto the inclined operative face 27 of the blade. The projecting point or wedge 60 is of a width less than the width of the groove 17a in the grinding wheel and lies idly therein during the actual grinding operation. After the work piece has been deposited on the work rest blade the reverse movement of the bar immediately takes place whereupon the spring 42 returns the arm 46 to its normal position again placing the beam in the dotted line position shown in Figure 4, but without a work piece between the solid and spring fingers 50 and 52. The bar 31 continues to move to the right until the upper portion of the arm 46 engages with the stop 58 whereupon the arm 46 is again oscillated in a counterclockwise direction. This movement causes the beam to take the position indicated in dotted lines in Figure 5 and causes the fixed and spring fingers 50 and 52 to engage a work piece lying at the base of the work chute in alignment with the lateral openings 56 therein. The parts remain in this position until the work piece within the machine is completed whereupon a cycle as above described is initiated.

After the work piece is mounted on the work rest blade, the slides 19 and 21 are jointly actuated toward the grinding wheel carrying with them the work piece which is to be fed into the grinding wheel. For this purpose there is provided an adjusting screw 61 having its threaded end threadedly engaged with a nut 62 carried by the bracket or housing 22 of the upper slide. The screw 61 has its rear end 63 reduced which is received in a sliding block 64 disposed in a bearing 65 formed interiorly of the housing 38. The screw being secured in said block against axial but not rotative movement relative thereof and for axial movement therewith. The block 64 has pivotally secured to its opposite sides one end of links 67 and 68, the other ends of said links being respectively received between lugs 69 and 70 of a bell crank 71. The bell crank 71 is pivoted by means of pins 72 and 73 to the rear wall of the housing 38 and a partition 74 disposed interiorly of the said housing. The depending arm 75 of the bell crank 71 is provided with an adjustable roller 76 received in cam track 77 of rotating cam 78. This cam is keyed or otherwise secured to cam shaft 79 rotatably journaled in a bearing 80 interiorly of the housing 38 and the shaft 79 carries at its other end a worm wheel 81. Meshing with the worm wheel 81 is a worm 82 on worm shaft 83 which extends beyond the lines of the housing 38 and is connected in any desirable manner such as by a belt or the like 84 with a prime mover or motor 85 secured to the under face of the housing 38.

The cam track 77 is provided with an abrupt portion 86 for rapidly advancing the work into contact with the wheel, which portion 86 terminates in a gradually rising portion 87 for feeding the work into the grinding wheel for effecting the actual grinding operation. The gradual rising portion 87 of the cam is followed by the concentric portion 88 for holding the parts comparatively stationary to effect the rounding up of the work and the sparking out between the work and grinding wheel. The cam is then provided with an abrupt portion 89 for rapidly retracting the work from the grinding wheel.

From the foregoing it will be noted that after the work piece has been mounted on the work rest blade it is actuated toward the grinding wheel to reduce it to the desired size and form and then withdrawn therefrom.

The cam 78 is provided on its rear surface with a raised cam portion 90 adapted to contact with a lug 91 projecting from the adjacent face of a pivoted arm 92 pivoted at one end 93 to a lug carried by the housing 38 interiorly thereof. The upper end of the arm 92 has formed therein an elongated perforation 94 receiving a pin 95 projecting from the side of a slidable bar 96 actuable through suitable bearings provided by the housing 38. The forward end of the bar 96 is provided with a substantially hooked nose 97 co-operating with the ratchet tooth 98 formed on disc member 99. The disc 99 is rotatably journaled in ears or lugs 100 extending inwardly from the forward wall of the housing 38 and the said disc has a splined connection as at 101 with the end of the rock shaft 36 which terminates within the housing 38. The cam 78 is continuously rotating for continuously shifting the upper and lower slides toward and from the grinding wheel. At each complete cycle of movement of the said slides the arm 92 is oscillated for rocking the shaft 36 and thereby operating the feeding mechanism as above described in detail.

Figure 2:
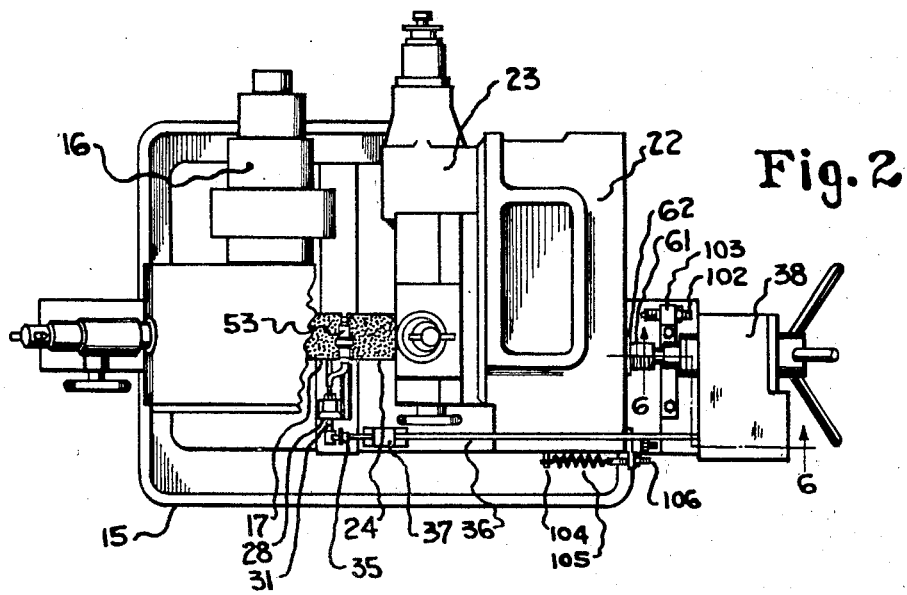
Figure 2 is a top plan view of the machine shown in Figure 1.

In order to discharge the work from the work rest blade, the said blade and the regulating wheel are adapted to be relatively separated to thereby allow the work to roll by gravity down the inclined operative face of the blade into a suitable receptacle placed for the reception of said work pieces. This is accomplished by means of an adjustable stop screw 102 carried by a bracket 103 secured to the rearmost portion of the bed, which stop screw is adapted to engage the rear end of the lower slide 19 thereby stopping any further movement of said slide while permitting the upper slide to travel beyond the lower slide and since the work rest blade is carried by the lower slide and the wheel by the upper slide a relative separation will take place. In order that the wheel and work rest assume their normal positions, the lower slide has projecting from it a pin 104 to which one end of a spring 105 is attached, the other end of the spring being attached to an adjustable screw 106 adjustably threaded into a bracket 107 carried by the upper slide 21. A positive coupling is had between the slides by means of the adjustable stop screw 108 extending through the bracket 107 and contacting with the rearmost surface of the lower slide so that when the upper slide is actuated to the left, as seen in Figures 1, 2 and 10, it carries with it the lower slide 21.

The timing between the cam track 77 of the cam 78 and the cam lug 90 is such that the separation between the regulating wheel and work rest blade takes place and the parts assume their normal positions before the work loading mechanism is operated or before the oscillation of the lever 93. From the foregoing it will be seen that there has been provided an automatic centerless grinder for expeditiously loading small work pieces into the grinding throat of a centerless grinder and for expeditiously and properly effecting the grinding thereof.

What is claimed is:

1. In a centerless grinder the combination of a pair of opposed grinding and regulating wheels forming a grinding throat therebetween, a work rest blade within said throat, a work delivery chute adjacent the throat and in alignment therewith, and means for transferring work pieces individually from the work delivery chute to the work rest blade, comprising an arm slidably and pivotally mounted for movement between the work chute and the work rest blade.

2. In a centerless grinder for grinding independent portions of a work piece the combination of a pair of opposed grinding and regulating wheels spaced from one another to form a grinding throat of the desired size, a work rest blade within the grinding throat, a work delivery chute terminating in a point adjacent the work rest blade, an arm movable between the work rest blade and work chute for transferring work pieces from the chute to the blade, and means pivotally mounting the arm for oscillatory movement at each end of its transfer travel for removing a work piece from the chute and depositing same on the blade.

3. In a centerless grinder for grinding independent portions of a work piece the combination of a pair of opposed grinding and regulating wheels spaced from one another to form a grinding throat of the desired size, a work rest blade within the grinding throat, a work delivery chute terminating at a point adjacent the work rest blade, an arm movable between the work rest blade and work chute for transferring work pieces from the chute to the blade, means pivotally mounting the arm for oscillatory movement at each end of its transfer travel for removing a work piece from the chute and depositing same on the blade, yieldable means for holding the arm in its normal position during the transfer movement, and means for actuating the arm.

4. In a centerless grinder for grinding independent portions of a work piece the combination of a pair of opposed grinding and regulating wheels spaced from one another to form a grinding throat of the desired size, a work rest blade within the grinding throat, a work delivery chute terminating at a point adjacent the work rest blade, an arm movable between the work rest blade and work chute for transferring work pieces from the chute to the blade, means pivotally mounting the arm for oscillatory movement at each end of its transfer travel for removing a work piece from the chute and depositing same on the blade, yieldable means for holding the arm in its normal position during the transfer movement, means for actuating the arm, and means actuating one of the wheels toward the other for effecting a relative feed between the work and grinding wheel.

5. In a centerless grinder for grinding independent portions of a work piece the combination of a pair of opposed grinding and regulating wheels spaced from one another to form a grinding throat of the desired size, a work rest blade within the grinding throat, a work delivery chute terminating at a point adjacent the work rest blade, an arm movable between the work rest blade and work slide for transferring work pieces from the chute to the blade, means pivotally mounting the arm for oscillatory movement at each end of its transfer travel for removing a work piece from the chute and depositing same on the blade, yieldable means for holding the arm in its normal position during the transfer movement, means for actuating the arm, means actuating one of the wheels toward the other for effecting a relative feed between the work and grinding wheel, and means synchronizing the movement of the arm and the movement of the wheel with one another whereby the work is transferred during the time the wheels are held relatively stationary.

6. In a centerless grinder of the class described the combination of a pair of opposed grinding and regulating wheels spaced from one another to form a grinding throat therebetween, a work rest blade disposed within the throat, a slide supporting the work rest blade, a second slide superimposed on the first for supporting the regulating wheel, a yieldable tie between the said slides whereby they may be actuated jointly and independently, means limiting the independent movement of the slides, a work delivery chute in alignment with the grinding throat and terminating adjacent thereto, the work rest blade having an inclined operative surface, means transferring work pieces from the chute to the angle surface of the work rest blade, and means actuating the slides and transfer means in timed sequential order whereby the work is deposited on the blade while the slides are held against independent movement and whereby independent actuation of the slides causes the work to be discharged from the blade by gravity.

7. In a mechanism for placing work pieces on the work rest blade of a centerless grinder the combination with such a work rest blade, of a work delivery chute terminating adjacent thereto for conveying work pieces by gravity to the end thereof, and means for transferring the work from the chute to the blade, comprising an arm adapted to have oscillatory and rectilinear movement relative to the blade and slide.

8. In a mechanism for placing work pieces on the work rest blade of a centerless grinder the combination with such a work rest blade, of a work delivery chute terminating adjacent thereto for conveying work pieces by gravity to the end thereof, means for transferring the work from the chute to the blade, comprising an arm adapted to have oscillatory and rectilinear movement relative to the blade and chute, yieldable means normally holding the arm in a vertical position, means operable at one end of the rectilinear movement of the arm for oscillating same towards the work chute to effect a pick up of the work therefrom by the arm, and additional means operable at the other end of the rectilinear movement of the arm for causing the arm to deposit the work onto the work rest blade.

9. In a mechanism for placing work pieces on the work rest blade of a centerless grinder the combination with such a work rest blade, of a work delivery chute terminating adjacent thereto for conveying work pieces by gravity to the end thereof, means for transferring the work from the chute to the blade, comprising an arm adapted to have oscillatory and rectilinear movement relative to the blade and chute, yieldable means normally holding the arm in a vertical position, means operable at one end of the rectilinear movement of the arm for oscillating same towards the work chute to effect a pick up of the work therefrom by the arm, additional means operable at the other end of the rectilinear movement of the arm for causing the arm to deposit the work onto the work rest blade, and means associated with the arm for holding the work piece including a non-yielding finger and a yielding finger spaced from one another a distance less than the size of the work to be carried thereby.

10. In a mechanism for placing work pieces on the work rest blade of a centerless grinder the combination with such a work rest blade, of a work delivery chute terminating adjacent thereto for conveying work pieces by gravity to the end thereof, means for transferring the work from the chute to the blade, comprising an arm adapted to have oscillatory and rectilinear movement relative to the blade and chute, yieldable means normally holding the arm in a vertical position, means operable at one end of the rectilinear movement of the arm for oscillating same towards the work chute to effect a pick up of the work therefrom by the arm, additional means operable at the other end of the rectilinear movement of the arm for causing the arm to deposit the work onto the work rest blade, means associated with the arm for holding the work piece including a non-yielding finger and a yielding finger spaced from one another a distance less than the size of the work to be carried thereby, and means carried by the work rest blade for opening the distance between the fixed and yielding fingers for thereby releasing the work therefrom.

11. In a centerless grinder of the class described the combination of a bed, a grinding wheel rotatably mounted thereon, a regulating wheel carried by the bed for movement toward and from the grinding wheel, the grinding and regulating wheels forming a grinding throat between them, a work rest blade within said grinding throat, and means for depositing work pieces on the work rest blade, comprising a rod slidable in a direction extending axially of the grinding throat, an arm pivoted to the rod, means carried by the rod and arm for normally holding the arm in a vertical position for rectilinear movement with the rod, a work chute terminating adjacent the work rest blade, and means carried by the arm for supporting a work piece to transfer same from the chute to the blade.

12. In a centerless grinder of the class described the combination of a bed, a grinding wheel rotatably mounted thereon, a regulating wheel carried by the bed for movement toward and from the grinding wheel, the grinding and regulating wheels forming a grinding throat between them, a work rest blade within said grinding throat, and means for depositing work pieces on the work rest blade, comprising a rod slidable in a direction extending axially of the grinding throat, an arm pivoted to the rod, means carried by the rod and arm for normally holding the arm in a vertical position for rectilinear movement with the rod, a work chute terminating adjacent the work rest blade, means carried by the arm for supporting a work piece to transfer same from the chute to the blade, and means for oscillating the arm about its pivotal mounting for engaging the work by the work carrying portion of the arm when at one end of its rectilinear movement and for oscillating the arm to deposit the work carried thereby onto the work rest blade when at the other end of its rectilinear movement.

13. In a centerless grinder of the class described the combination of a bed, a grinding wheel rotatably mounted thereon, a regulating wheel carried by the bed for movement toward and from the grinding wheel, the grinding and regulating wheels forming a grinding throat between them, a work rest blade within said grinding throat, and means for depositing work pieces on the work rest blade, comprising a rod slidable in a direction extending axially of the grinding throat, an arm pivoted to the rod, means carried by the rod and arm for normally holding the arm in a vertical position for rectilinear movement with the rod, a work chute terminating adjacent the work rest blade, means carried by the arm for supporting a work piece to transfer same from the chute to the blade, means for oscillating the arm about its pivotal mounting for engaging the work by the work carrying portion of the arm when at one end of its rectilinear movement and for oscillating the arm to deposit the work carried thereby onto the work rest blade when at the other end of its rectilinear movement, and means associated with the work rest blade for releasing the work piece carried by the arm.

14. In a centerless grinder of the class described the combination of a bed, a grinding wheel rotatably mounted thereon, a regulating wheel carried by the bed for movement toward and from the grinding wheel, the grinding and regulating wheels forming a grinding throat between them, a work rest blade within said grinding throat, and means for depositing work pieces on the work rest blade, comprising a rod slidable in a direction extending axially of the grinding throat, an arm pivoted to the rod, means carried by the rod and arm for normally holding the arm in a vertical position for rectilinear movement with the rod, a work chute terminating adjacent the work rest blade, means carried by the arm for supporting a work piece to transfer same from the chute to the blade, means for oscillating the arm about its pivotal mounting for engaging the work by the work carrying portion of the arm when at one end of its rectilinear movement and for oscillating the arm to deposit the work carried thereby onto the work rest blade when at the other end of its rectilinear movement, means associated with the work rest blade for releasing the work piece carried by the arm, means for effecting a relative feed between the work and grinding wheel to reduce the size of the work on the work rest blade, and means for effecting a relative separation between the regulating wheel and work rest blade at the conclusion of the grinding operation to effect discharge of the work from the blade.

In testimony whereof, I affix my signature.

CARL G. LILJEBERG.